United States Patent
Brown

(10) Patent No.: US 9,708,779 B2
(45) Date of Patent: Jul. 18, 2017

(54) MATERIAL TRANSFER VEHICLE HAVING AN EXPANDABLE TRUCK-RECEIVING HOPPER

(71) Applicant: Roadtec, Inc., Chattanooga, TN (US)

(72) Inventor: Irina Brown, Dalton, GA (US)

(73) Assignee: Roadtec, Inc., Chattanooga, TN (US)

( * ) Notice: Subject to any disclaimer, the term of this patent is extended or adjusted under 35 U.S.C. 154(b) by 59 days.

(21) Appl. No.: 14/975,017

(22) Filed: Dec. 18, 2015

(65) Prior Publication Data
US 2016/0176650 A1    Jun. 23, 2016

Related U.S. Application Data

(60) Provisional application No. 62/095,167, filed on Dec. 22, 2014.

(51) Int. Cl.
*E01C 19/48*     (2006.01)
(52) U.S. Cl.
CPC .......... *E01C 19/48* (2013.01); *E01C 2301/04* (2013.01)
(58) Field of Classification Search
CPC .............................. E01C 19/48; E01C 2301/04
USPC ......................................................... 404/108
See application file for complete search history.

(56) References Cited

U.S. PATENT DOCUMENTS

| | | | |
|---|---|---|---|
| 3,648,859 A | 3/1972 | Johnson | |
| 3,997,277 A | 12/1976 | Swisher, Jr. et al. | |
| 4,200,408 A * | 4/1980 | Babler | E01C 19/48 198/316.1 |
| 4,322,178 A | 3/1982 | Lee | |
| 4,944,630 A * | 7/1990 | Brock | B62D 53/08 198/312 |
| 5,015,120 A * | 5/1991 | Brock | B60P 1/38 404/108 |
| 5,035,534 A * | 7/1991 | Brock | B60P 1/38 241/135 |
| 5,100,277 A * | 3/1992 | Musil | E01C 19/48 404/108 |
| 5,234,128 A | 8/1993 | Hill | |

(Continued)

OTHER PUBLICATIONS

Vogele, brochure for PowerFeeder MT 3000-2i Offset, http://media.voegele.info/media/03_voegele/produkte/broschueren . . . , download date Dec. 18, 2015.

*Primary Examiner* — Raymond W Addie
(74) *Attorney, Agent, or Firm* — Chambliss, Bahner & Stophel, P.C.

(57) ABSTRACT

A material transfer vehicle includes a truck-receiving hopper that is adapted to receive asphalt material from a delivery truck. The truck-receiving hopper includes an expandable front portion having a right expandable sidewall assembly and a left expandable sidewall assembly. The right expandable sidewall assembly has a right outer front sidewall panel and a mechanism for moving the right outer front sidewall panel between an inner right position and an outer right position. The left expandable sidewall assembly has a left outer front sidewall panel and a mechanism for moving the left outer front sidewall panel between an inner left position and an outer left position. The truck-receiving hopper also includes a rear portion having a right sidewall panel and a left sidewall panel. The right and left sidewall panels of the rear portion are fixed against movement with respect to each other.

18 Claims, 10 Drawing Sheets

(56) References Cited

U.S. PATENT DOCUMENTS

| | | | | |
|---|---|---|---|---|
| 5,470,175 A | * | 11/1995 | Jensen | ............... E01C 19/15 |
| | | | | 404/108 |
| 6,193,437 B1 | | 2/2001 | Heims | |
| 6,702,135 B2 | | 3/2004 | Pickler | |
| 6,776,557 B2 | | 8/2004 | Barnat et al. | |
| 7,160,056 B1 | * | 1/2007 | Hoffmann | ............ E01C 19/48 |
| | | | | 404/108 |
| 7,785,034 B2 | * | 8/2010 | Hood | ............... E01C 19/00 |
| | | | | 404/112 |
| 8,591,146 B2 | * | 11/2013 | Begley | ............... E01C 19/48 |
| | | | | 198/303 |
| 8,936,145 B2 | | 1/2015 | Buschmann et al. | |
| 9,028,167 B2 | | 5/2015 | Buschmann et al. | |
| 2002/0182009 A1 | | 12/2002 | Barnat et al. | |
| 2010/0178107 A1 | * | 7/2010 | Braddy | ............ E01C 19/182 |
| | | | | 404/75 |

* cited by examiner

MATERIAL TRANSFER VEHICLE HAVING AN EXPANDABLE TRUCK-RECEIVING HOPPER

CROSS-REFERENCE TO RELATED APPLICATION

This application claims the benefit of U.S. Provisional Patent Application No. 62/095,167, which was filed on Dec. 22, 2014.

FIELD OF THE INVENTION

This invention relates generally to a material transfer vehicle that is adapted for transferring asphalt from a supply truck to an asphalt paving machine. More particularly, the invention relates to a material transfer vehicle having a truck-receiving hopper, a portion of which can be manipulated to change its width.

BACKGROUND OF THE INVENTION

The traditional process for paving roadways with asphalt material is generally carried out by an asphalt paving machine and a number of supply trucks which transport the asphalt material from an asphalt production plant to the paving machine. The paving machine generally is self-propelled and driven by a wheeled or tracked drive system. A hopper is located at the front end of the machine to receive asphalt material from a truck, and a floating screed is located at the rear end of the machine to form the asphalt mat. A conveyor system typically comprised of slat conveyors and screw augers delivers the asphalt material from the hopper to the road base just ahead of the screed.

A typical asphalt paving machine has a hopper with a capacity of 5-15 tons, whereas a typical dump-type delivery truck has a capacity of about 20 tons. The front of the paving machine is usually provided with rollers which are adapted to engage the rear tires of a delivery truck. This arrangement enables asphalt material to be transferred from the truck to the asphalt paving machine by positioning the delivery truck in front of the paving machine and raising the dump bed of the truck to dump the asphalt material into the hopper as the paving machine pushes the truck along in front of it. Because the delivery truck usually carries more asphalt material than the hopper can receive at one time, the paving machine may push the delivery truck along for several minutes while its conveyor system transports the asphalt material out of the hopper to the roadway in front of the screed.

Sometimes, problems may arise when operating the paving machine and the delivery trucks in this manner. Because of traffic conditions and other unforeseen delays, it is not uncommon for the paving machine to empty its hopper of asphalt material before a loaded delivery truck is available to begin dumping its asphalt material into the hopper. When this occurs, the paving machine must stop paving and await the arrival of another delivery truck. Even if one or more loaded delivery trucks are available to dump asphalt material into the paving machine hopper, it may be necessary to stop the paving machine. Sometimes, it is simply impossible for the truck drivers to remove an empty delivery truck from engagement with the front of the paving machine and to maneuver a loaded truck into position to dump into the hopper before the hopper is emptied.

It is known to provide paving machines with receiving hoppers that have wings or other structures that can be tilted about a generally horizontal axis to urge material into the conveyor underneath the middle of the hopper. Such constructions are described in U.S. Pat. No. 6,193,437 and No. 8,936,145. The tilting of these wing structures will sometimes result in spillage of material from the hopper onto the roadway and will sometimes result in some material remaining in the hopper in the vicinity of the tilt hinges.

As is known to those having ordinary skill in the art to which the invention relates, when a paving machine stops, even for a short time, the screed will tend to settle into the freshly laid asphalt mat. Then, when the paving machine resumes its forward motion, the screed will tend to ride upwardly momentarily, thus depositing an excessive amount of asphalt material on the roadway. Consequently, stopping of the paving machine causes a depression and a bump in the surface of the asphalt mat, resulting in an uneven pavement surface. Therefore, in recent years, material transfer vehicles have been employed to shuttle asphalt material between the delivery trucks and the paving machine. Such a material transfer vehicle is described in various embodiments in U.S. Pat. No. 4,818,139, No. 5,015,120, and No. 5,035,534, which are incorporated herein by reference. These patents describe a self-propelled material transfer vehicle which includes a large-capacity truck-receiving hopper and a large-capacity truck-unloading conveyor extending from this hopper to a surge bin that is sized to hold the entire load of a delivery truck. A conveyor in the surge bin is adapted to transfer asphalt material to a paver-loading conveyor that is pivotable about an essentially vertical axis so that the transfer vehicle can be positioned alongside an asphalt paving machine that is laying an asphalt mat and rapidly discharge a truckload of asphalt material into the paver's hopper. Because of its rapid loading and unloading capabilities, the material transfer vehicle can rapidly shuttle between delivery trucks at a pick-up point and a paving machine that is laying an asphalt mat so that there is less likelihood that the paving machine will have to stop paving because of a lack of asphalt material.

Because the material transfer vehicle travels on the roadway like the delivery trucks from which it obtains asphalt material, its dimensions must conform to state and federal highway standards for on-road vehicles. Consequently, the truck-receiving hopper of a material transfer vehicle may be the same width as the dump body of a delivery truck. This requires the driver of the delivery truck to maneuver his vehicle to precisely align the dump body with the truck-receiving hopper of the material transfer vehicle. This can be a time-consuming operation, and it may result in spillage of some of the asphalt material from the truck onto the roadway adjacent to the truck-receiving hopper.

The Vögele MT 3000 material transfer vehicle has a truck-receiving hopper that includes rigid sidewalls, each of which is attached to a portion of a rigid rear hopper wall. The hopper auger of this machine, which assists in moving material to the adjacent conveyor, is provided in two sections. Each hopper auger section is supported only at the sidewall, extends across a portion of the width of the hopper and is unsupported at its far end. The sidewalls are adapted to move towards and away from each other so as to vary the width of the entire truck-receiving hopper. Such a construction will allow a delivery truck driver some leeway in aligning the dump body of his truck with the truck-receiving hopper. However, the hopper auger construction is more complicated and expensive than is the hopper auger that is provided in two sections which are supported at both ends, as is found in a typical material transfer vehicle, and it requires more maintenance than a conventional hopper auger.

It would be advantageous if a system and apparatus could be provided that would allow the driver of the delivery truck more flexibility in unloading into the truck-receiving hopper of a material transfer vehicle, while also providing a hopper structure that is reliable and relatively inexpensive to build.

ADVANTAGES OF THE INVENTION

Among the advantages of a preferred embodiment of the invention is that it provides a modified truck-receiving hopper, the width of a front portion of which may be selectively changed in order to improve the efficiency of the asphalt material delivery process and reduce the likelihood of spillage of asphalt material during unloading of a delivery truck. This allows for faster unloading of an asphalt delivery truck and more efficient operation of the material transfer vehicle in the paving process.

Other advantages and features of this invention will become apparent from an examination of the drawings and the ensuing description.

Notes On Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

Several terms are specifically defined herein. These terms are to be given their broadest possible construction consistent with such definitions, as follows:

The term "asphalt material" refers to a bituminous paving mixture that is comprised of asphalt binder and any of various aggregate materials, and which is used for paving purposes.

The terms "asphalt paving machine" and "paver" refer to a finishing machine for applying asphalt material to form an asphalt mat on a roadway, parking lot or similar surface. An asphalt paving machine or paver is typically a self-propelled vehicle having a hopper at one end for receiving asphalt material and a floating screed at the other end for forming an asphalt mat.

The term "asphalt mat" refers to a layer of asphalt material such as is applied by an asphalt paving machine to produce a roadway, parking lot or similar surface.

The term "material transfer vehicle" refers to a vehicle that is adapted to receive a truck-load of asphalt material and transfer it into the hopper of an asphalt paving machine. A material transfer vehicle includes a truck-receiving hopper that is adapted to receive asphalt material from a delivery truck, and a truck-unloading conveyor that is adapted to receive asphalt material from the truck-receiving hopper.

As used herein, the term "width", when used in connection with a truck-receiving hopper of a material transfer vehicle, refers to the dimension of the hopper or portion thereof that is measured in a direction that is generally perpendicular to the long axis of the truck-unloading conveyor which is attached to or associated with the truck-receiving hopper.

As used herein, the term "left", when used to indicate a side or direction of a truck-receiving hopper of a material transfer vehicle or a component thereof, refers to the side or direction that is to the left of an observer who is facing the end of the material transfer vehicle on which the truck-receiving hopper is mounted.

As used herein, the term "right", when used to indicate a side or direction of a truck-receiving hopper of a material transfer vehicle or a component thereof, refers to the side or direction that is opposite the left side.

The terms "front" and "front end" of the truck-receiving hopper of a material transfer vehicle refer to the end of the hopper that is adjacent the delivery truck when the truck is unloading asphalt material into the hopper.

The terms "rear" and "rear end" of the truck-receiving hopper of a material transfer vehicle refer to the end of the hopper opposite the front end.

The terms "forward" and "in front of", as used herein to describe a relative position or direction on or in connection with a truck-receiving hopper of a material transfer vehicle or a component thereof, refer to a relative position towards the front end of the hopper.

The terms "rearward", "behind" and "rearwardly", as used herein to describe a relative position or direction on or in connection with a truck-receiving hopper of a material transfer vehicle or a component thereof, refer to a relative position or direction towards the rear end of the hopper.

The terms "downward" and "downwardly", as used herein to describe a relative direction on or in connection with a material transfer vehicle or a truck-receiving hopper thereof, refer to a direction towards the roadway on which the vehicle is being operated.

The terms "lower" and "below", as used herein to describe the relative position on or in connection with a truck-receiving hopper of a material transfer vehicle or a component thereof, refer to a relative position that is in the downward direction.

The terms "upward" and "upwardly", as used herein to describe a relative direction on or in connection with a material transfer vehicle or a truck-receiving hopper thereof, refer to a direction away from the roadway on which the vehicle is being operated.

The terms "upper" and "above", as used herein to describe the relative position on or in connection with a truck-receiving hopper of a material transfer vehicle or a component thereof, refer to a relative position that is in the upward direction.

The term "linear actuator" refers to an electric, hydraulic, electro-hydraulic or mechanical device that generates force which is directed in a straight line. One common example of a "linear actuator" is a double-acting hydraulic or pneumatic actuator which includes a cylinder, a piston within the cylinder, and a rod attached to the piston. By increasing the pressure within the cylinder on one side of the piston (over that on the opposite side of the piston), the rod will extend from the cylinder or retract into the cylinder.

SUMMARY OF THE INVENTION

The invention comprises an apparatus for selectively changing the width of a portion of the truck-receiving hopper of a material transfer vehicle. The truck-receiving hopper includes an expandable front portion comprising a right expandable sidewall assembly and a left expandable sidewall assembly. The right expandable sidewall assembly has a right outer front sidewall panel and means for moving the right outer front sidewall panel between an inner right position and an outer right position. Similarly, the left expandable sidewall assembly has a left outer front sidewall panel and means for moving the left outer front sidewall panel between an inner left position and an outer left position. The truck-receiving hopper also includes a rear portion having a right sidewall panel and a left sidewall panel, which right and left sidewall panels are fixed against movement with respect to each other.

Each of the right and left expandable sidewall assemblies in a preferred embodiment of the invention includes a base plate that is adapted to move towards and away from the center of the hopper on the floor of the hopper base frame by actuation of a double-acting linear actuator. An outer front sidewall panel is attached to the base plate, and an inner fixed sidewall panel is attached to a hopper side panel. A first moveable panel is hingedly attached to the inner fixed sidewall panel, and a second moveable panel is hingedly attached to the first moveable panel. When the rod end of the double-acting linear actuator extends from the retracted position to the extended position, the base plate will move from the retracted position away from the center of the hopper to the extended position. As it does so, the first moveable panel pivots about its hinge to the inner fixed sidewall panel to move from a retracted position in alignment with the hopper side panel to an extended position that is generally perpendicular to the plane of hopper side panel. At the same time, the second moveable panel pivots about its hinge to the first moveable panel and moves away from the outer end of the hopper in a direction parallel to the plane of outer front sidewall panel to the extended position. The rod end of each double-acting linear actuator will preferably extend and retract simultaneously, so that the corresponding structures of the left and right expandable sidewall assemblies move in a complementary fashion.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

DETAILED DESCRIPTION OF THE PREFERRED EMBODIMENTS

Figure 1:
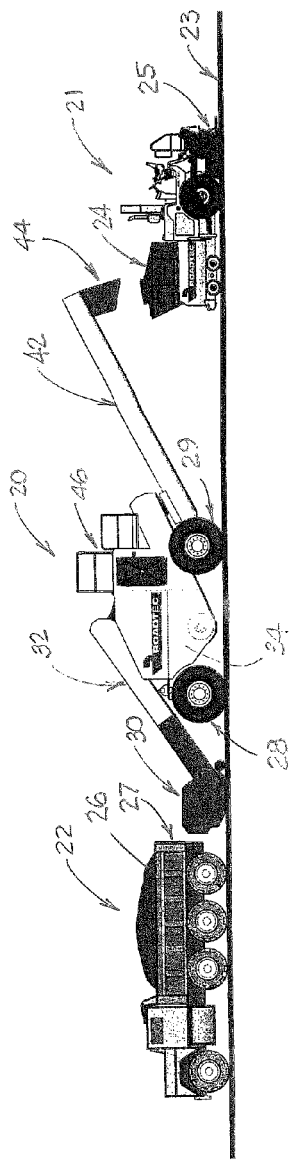
FIG. 1 is a side view of a conventional material transfer vehicle in association with an asphalt supply truck and an asphalt paving machine.

As shown in FIG. 1, a conventional self-propelled material transfer vehicle 20 is positioned adjacent to and between asphalt paving machine 21 and conventional asphalt supply truck 22. Paving machine 21 may be operated to pave roadway 23 in a direction from right to left, as shown in FIG. 1. Paving machine 21 includes hopper 24 at its front end and vibratory screed 25 at its rear end. Paving machine 21 also includes a conventional conveyor system comprising longitudinally disposed conveyors (not shown) and a transversely disposed screw auger (also not shown) for delivering the asphalt from hopper 24 to a position just in advance of screed 25 where it is discharged onto the surface to be paved. Conventional supply truck 22 includes a pivotally mounted bed 26 with a tailgate 27, and is adapted to deliver asphalt material from a remote source to material transfer vehicle 20. Preferably, the supply truck delivers the asphalt material to the material transfer vehicle at a convenient location remote from the paving machine, and then the material transfer vehicle transports the asphalt material to the paving location for discharge into paving machine hopper 24. Thus, material transfer vehicle 20 is adapted to shuttle between asphalt supply trucks at an asphalt-receiving location and a paving machine that is engaged in paving a roadway.

Figure 3:
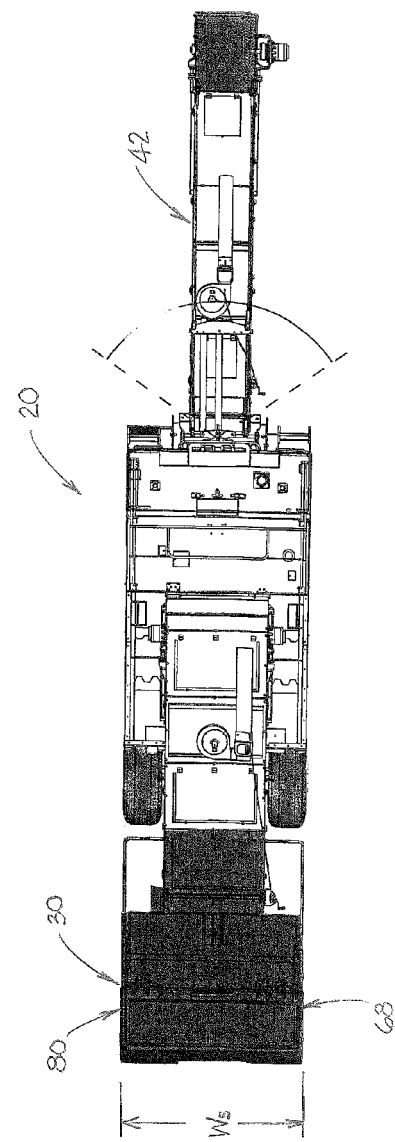
FIG. 3 is a top view of the material transfer vehicle shown in FIGS. 1 and 2.

Material transfer vehicle 20 includes a frame that is supported on the roadway surface by first wheel set 28 and second wheel set 29. Each of the wheel sets is driven by a hydraulic motor (not shown) that is supplied with fluid under pressure by one or more hydraulic pumps (also not shown). Vehicle 20 includes truck-receiving hopper 30 and truck-unloading conveyor 32 for receiving asphalt material from truck-delivery truck 22 and for conveying it to surge bin 34. The surge bin includes transverse auger 36 that is employed to mix the asphalt material in the surge bin in order to minimize segregation or separation of the aggregate portion of the asphalt material by size. Also located in the surge bin is surge conveyor 38, which is adapted to convey asphalt material out of the surge bin to chute 40 which is associated with paver-loading conveyor 42. Asphalt material conveyed out of the surge bin by conveyor 38 falls through chute 40 and onto paver-loading conveyor 42. Paver-loading conveyor 42 is mounted for vertical pivotal movement about a pivot at its entry end as raised and lowered by a linear actuator (not shown). Conveyor 42 is also adapted for side-to-side movement about a vertical axis (perpendicular to the plane of the paper on which FIG. 3 is shown) by operation of one or more additional actuators (also not shown). Asphalt material that falls through chute 40 onto paver-loading conveyor 42 is discharged through chute 44 into hopper 24 of paving machine 21.

Figure 2:
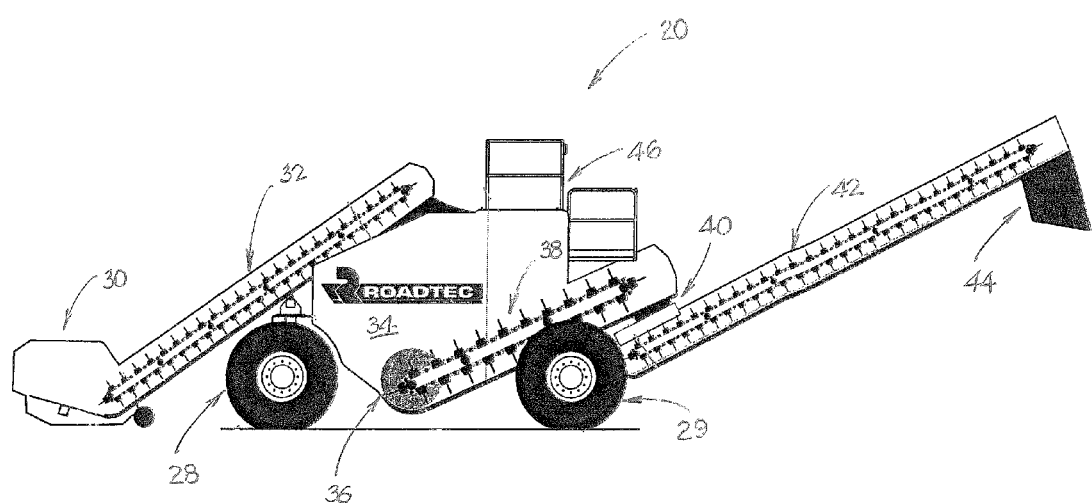
FIG. 2 is a partial sectional view of the material transfer vehicle shown in FIG. 1.

Truck-receiving hopper 30 of material transfer vehicle 20 has a standard width $W_S$ (shown in FIG. 3) that is generally of the same width as truck bed 26. Material transfer vehicle 20 is provided with a conventional mechanism such as one or more actuators (not shown) for moving hopper 30 vertically between a lowered asphalt material-receiving position (shown in FIGS. 1 and 2) that is optimally positioned to allow a supply truck to dump its asphalt material load into the hopper and one or more raised positions (not shown) including a raised travel position. Hydraulic drive systems including hydraulic pumps and hydraulic motors are provided to drive transverse auger 36 and the various conveyors, and an engine (not shown) provides the motive force for the hydraulic pumps that drive the hydraulic motors for the wheel sets, the transverse auger and the various conveyors and other components of the vehicle. Vehicle 20 is operated by an operator located at operator station 46.

As shown in FIGS. 4-16, truck-receiving hopper 50 is provided with an expandable front portion comprising 51 right expandable sidewall assembly 52 and left expandable sidewall assembly 54. Expandable front portion 51 of truck-receiving hopper 50 also includes a base frame, a rigid structure comprising base frame components 55, 56, 57 and 58 (best shown in FIG. 15), which is covered by floor 59 (shown partially cut away in FIG. 14) that supports the asphalt material discharged into hopper 50 from a delivery truck. Truck-receiving hopper 50 also includes a centerline 60 (shown in FIG. 7) and rear portion 61 comprising right sidewall panel 62 which is fixed against lateral movement, i.e., movement in a direction perpendicular to centerline 60, and left sidewall panel 63, which is also fixed against lateral movement. Rear portion 61 of the truck-receiving hopper includes an auger assembly that extends between and is supported by right sidewall panel 62 and left sidewall panel 63. Preferably, this auger assembly comprises a pair of conventional auger sections 64 and 65 (shown in FIG. 11), each of which auger sections has a left end and a right end. The left end of left auger section 64 is supported on left sidewall panel 63, and the right end of left auger section 64 is supported by center support 66. Similarly, the right end of right auger section 65 is supported on right sidewall panel 62, and the left end of right auger section 65 is supported by center support 66. Truck-unloading conveyor 68 is essentially identical to truck-unloading conveyor 32 of material transfer vehicle 20 (shown in FIGS. 1-3). Truck-unloading conveyor 68 has an entry end that includes a hopper opening adjacent to the rear portion 61 of truck-receiving hopper 50 and is adapted to receive asphalt material from the truck-receiving hopper, at least in part by the action of the auger assembly in rear portion 61. The combination of truck-receiving hopper 50 and truck-unloading conveyor 68 may be mounted on a material transfer vehicle such as vehicle 20 in place of truck-receiving hopper 30 and truck-unloading conveyor 32.

Right expandable sidewall assembly 52 includes right outer front sidewall panel 70 and right base plate 72. Right base plate 72 has lower side 74 (shown in FIG. 15) and right outer edge 76 (shown in FIG. 16). Right outer front sidewall panel 70 is attached to and extends upwardly from a position near right outer edge 76 of right base plate 72. Preferably right outer front sidewall panel 70 forms a right angle with right base plate 72. Right linear actuator 78 (shown in FIGS. 14 and 15) is mounted between the base frame and the lower side of the right base plate and is adapted to move right base plate 72 between an inner right position (shown in FIG. 7) and an outer right position (shown in FIG. 10) with respect to the base frame. Preferably, right linear actuator 78 is a double-acting hydraulic actuator having a rod end 80 that is attached to lower side 74 of right base plate 72 and a cylinder end 82 that is attached to the base frame.

Figure 14:
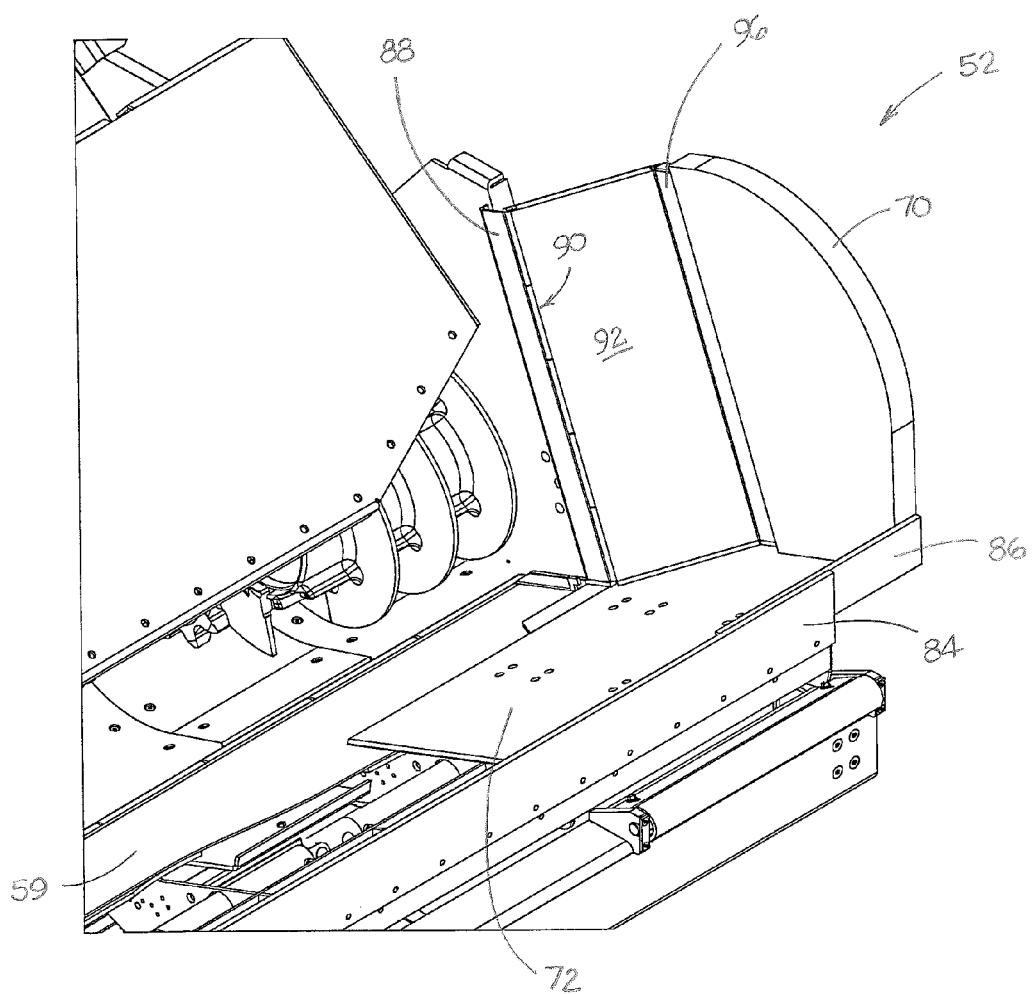
FIG. 14 is a perspective front view of the right expandable sidewall assembly of the truck-receiving hopper of a material transfer vehicle, showing the expandable sidewall assembly in the outer or extended position.
Figure 16:
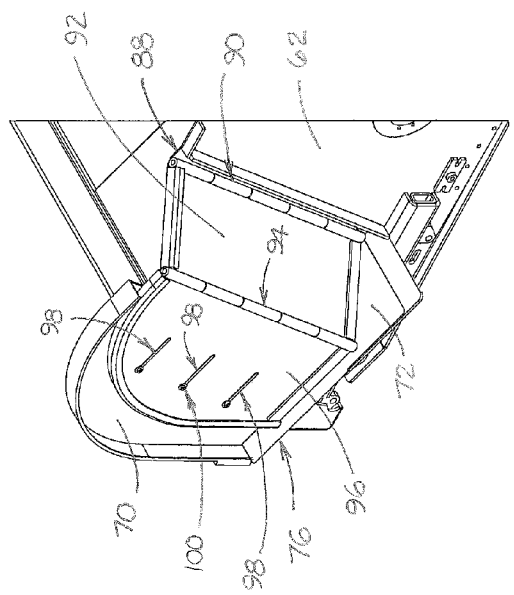
FIG. 16 is a perspective side view of the right expandable sidewall assembly of the truck-receiving hopper shown in FIGS. 14 and 15.

Attached to the front end of the base frame is elastomeric (or rubberized) outer lip 84 (shown in FIG. 14). Attached to the front end of right base plate 72 is elastomeric (or rubberized) right base plate lip 86 that slides adjacent to elastomeric outer lip 84 as right base plate 72 moves between the inner right position shown in FIG. 7 and the outer right position shown in FIG. 10. As shown in FIGS. 4-10, 14 and 16, the preferred right expandable sidewall assembly 52 includes inner fixed sidewall panel 88 that is attached to floor 59. Preferably, inner fixed sidewall panel 88 forms a right angle with floor 59 and is parallel to the inner surface of right sidewall panel 62. Attached by hinge 90 to inner fixed sidewall panel 88 is first right moveable panel 92. This hinge attachment by which first right moveable panel 92 of right expandable sidewall assembly 52 pivots with respect to inner fixed sidewall panel 88 and with respect to adjacent right sidewall panel 62 of rear portion 61 is preferably generally perpendicular to the plane of right base plate 72. Attached by hinge 94 to first right moveable panel 92 is second right moveable panel 96. This hinge attachment by which second right moveable panel 96 pivots with respect to first right moveable panel 92 is preferably generally perpendicular to the plane of right base plate 72. As shown in FIG. 16, second right moveable panel 96 has a plurality of guide slots 98 that are parallel to the plane of right base plate 72. A guide pin 100 for each slot is attached to right outer front sidewall panel 70 so as to extend into the guide slot. In some embodiments of the invention, the guide pins may be provided in the form of bolts that are capped with nuts on the right side of second right moveable panel 96.

Figure 15:
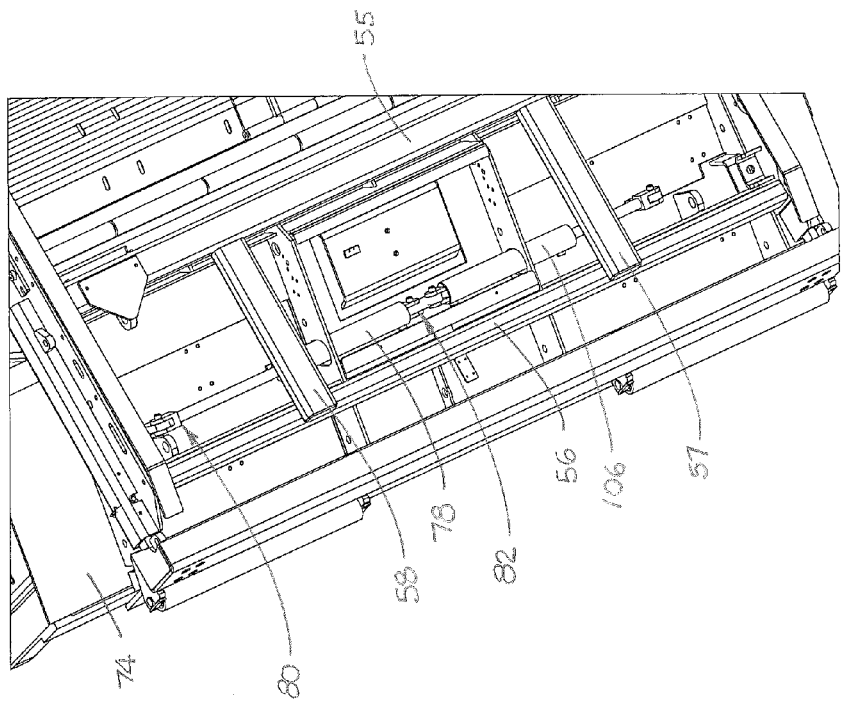
FIG. 15 is a perspective bottom view of the right expandable sidewall assembly of the truck-receiving hopper shown in FIG. 14.

When the rod end of right linear actuator 78 retracts from the extended position illustrated in FIGS. 14-16, right base plate 72 will move from the outer right position (best shown in FIG. 10) towards the centerline 60 of hopper 50. As it does so, first right moveable panel 92 pivots about hinge 90 to a retracted position in alignment with hopper right side panel 62. At the same time, second right moveable panel 96 pivots about hinge 94 and moves toward the front end of the hopper in a direction parallel to the plane of right outer front sidewall panel 70, as constrained by guide pins 100 in guide slots 98. The rod end of left linear actuator 63 will preferably retract simultaneously with that of right linear actuator, so that the corresponding structures of the left expandable sidewall assembly move in a complementary fashion to those of the right expandable sidewall assembly.

Left expandable sidewall assembly 54 is essentially a mirror image of right expandable sidewall assembly 52. Thus, left expandable sidewall assembly 54 includes left outer front sidewall panel 102 and left base plate 104. Left base plate 104 has a lower side (not shown) and a left outer edge. Left outer front sidewall panel 102 is attached to and extends upwardly from a position near the left outer edge of the left base plate. Preferably left outer front sidewall panel 102 forms a right angle with left base plate 104. Left linear actuator 106 (shown in FIG. 15) is mounted between the base frame and the lower side of the left base plate, and is adapted to move left base plate 104 between an inner left position (shown in FIG. 7) and an outer left position (shown in FIG. 10) with respect to the base frame. Attached to the front end of left base plate 104 is an elastomeric left base plate lip that slides adjacent to elastomeric outer lip 84 of the base frame as left base plate 104 moves between the inner left position shown in FIG. 7 and the outer left position shown in FIG. 10.

Figure 5:
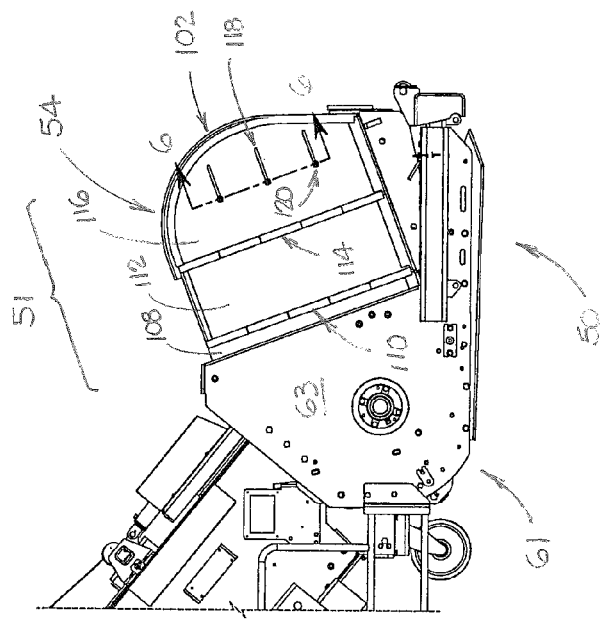
FIG. 5 is a side view of the truck-receiving hopper shown in FIG. 4.
Figure 4:
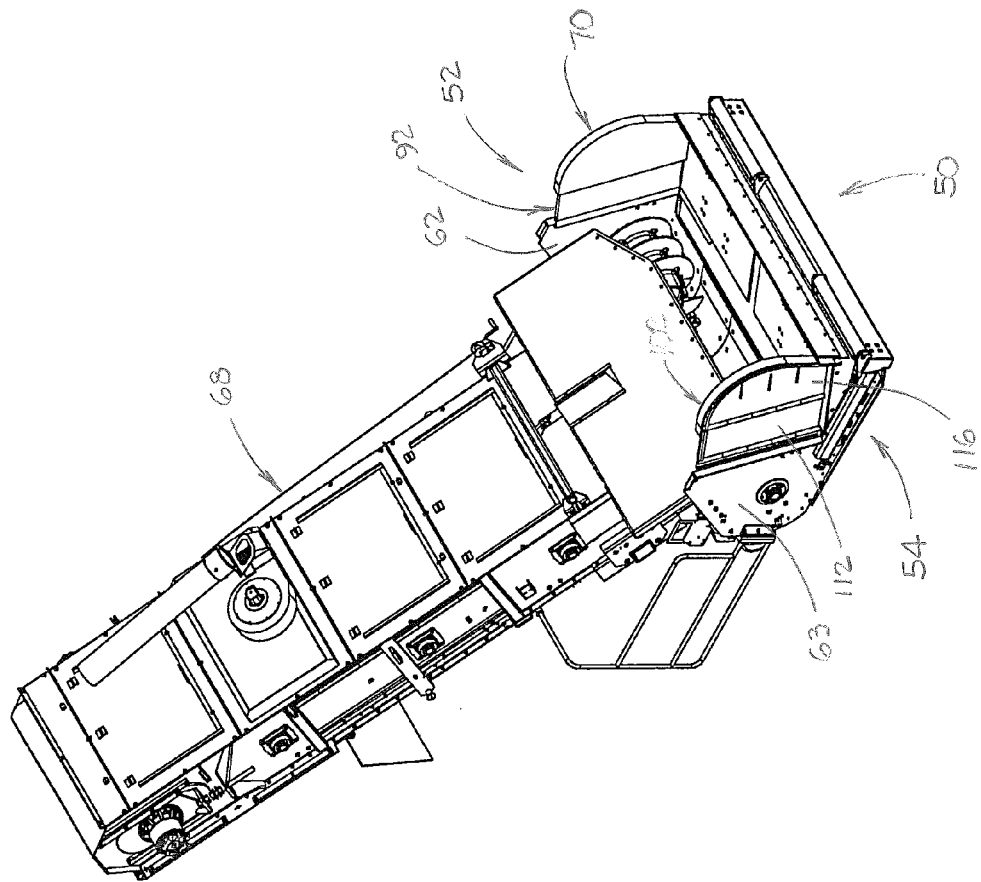
FIG. 4 is a perspective view of a truck-unloading conveyor that may be incorporated into a material transfer vehicle, with an associated truck-receiving hopper that is equipped with expandable sidewall assemblies, showing the sidewalls of the expandable sidewall assemblies in the inner or retracted positions.
Figure 9:
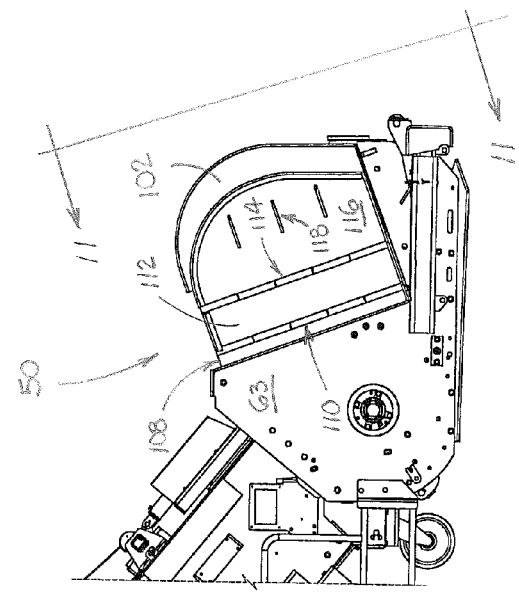
FIG. 9 is a side view of the truck-receiving hopper shown in FIG. 8.
Figure 8:
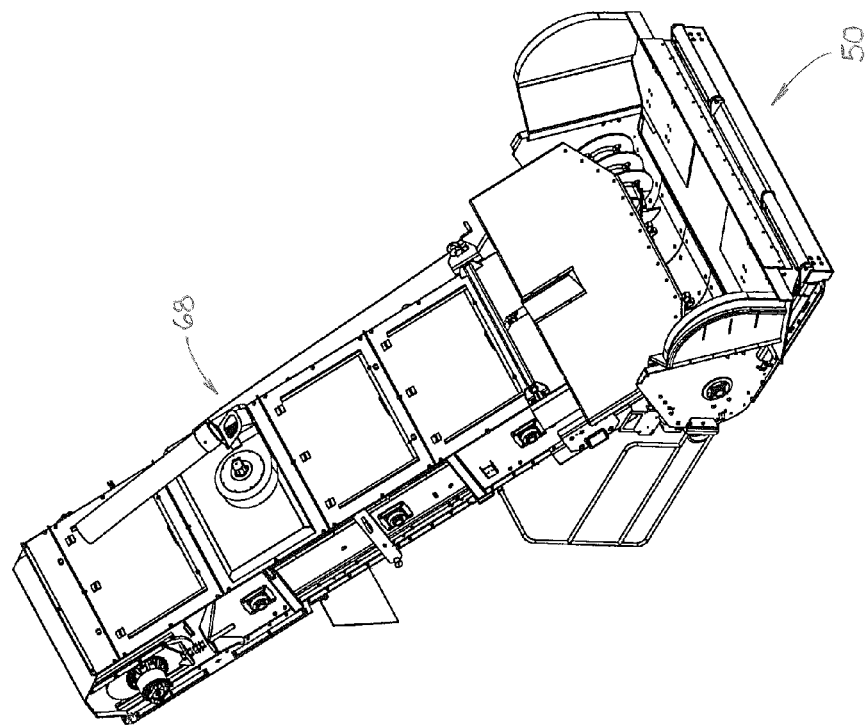
FIG. 8 is a perspective view of the truck-unloading conveyor and associated truck-receiving hopper shown in FIGS. 4-7, showing the sidewalls of the expandable sidewall assemblies in the outer or extended positions.

As best shown in FIGS. 4, 5 and 9, the preferred left expandable sidewall assembly 54 includes inner fixed sidewall panel 108 that is attached to floor 59. Preferably, inner fixed sidewall panel 108 forms a right angle with floor 59 and is parallel to the inner surface of left sidewall panel 63. Attached by hinge 110 to inner fixed sidewall panel 108 is first left moveable panel 112. This hinge attachment by which first left moveable panel 112 of left expandable sidewall assembly 54 pivots with respect to inner fixed sidewall panel 108 and with respect to adjacent left sidewall panel 63 of rear portion 61 is preferably generally perpendicular to the plane of left base plate 104. Attached by hinge 114 to first left moveable panel 112 is second left moveable panel 116. This hinge attachment by which second left moveable panel 116 pivots with respect to first left moveable panel 112 is preferably generally perpendicular to the plane of left base plate 104. As shown in FIGS. 5 and 9, second left moveable panel 116 has a plurality of guide slots 118 that are parallel to the plane of the left base plate. A guide pin 120 for each slot (see FIGS. 5 and 6) is attached to left outer front sidewall panel 102 so as to extend into the guide slot. In some embodiments of the invention, the guide pins may be provided in the form of bolts that are capped with nuts on the right side of second left moveable panel 116.

Preferably, as shown in FIG. 15, left linear actuator 106 and right linear actuator 78 are arranged within the base frame so that their rods extend and retract along the same line. It is also preferred that the left and right linear actuators are simultaneously retracted and extended so that they move in complementary fashion. As they do, right outer front sidewall panel 70 and left outer front sidewall panel 102 remain parallel to each other as the right and left baseplates move between the inner and outer positions with respect to the frame.

Figure 7:
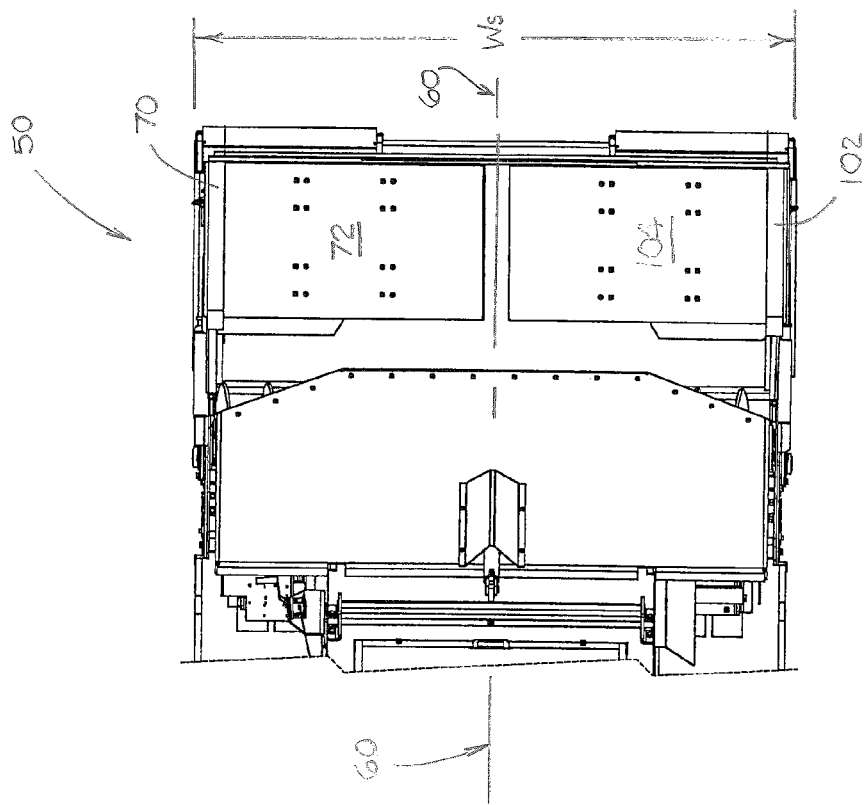
FIG. 7 is a top view of the truck-receiving hopper shown in FIGS. 4-6.
Figure 6:
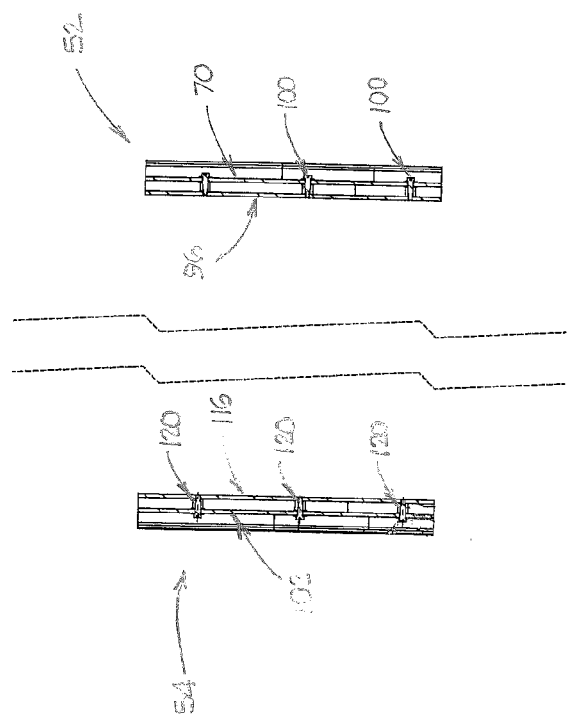
FIG. 6 is a sectional view of a portion of the right and left sidewall assemblies of the truck-receiving hopper shown in FIGS. 4 and 5, taken along the line 6-6 of FIG. 5, showing the guide pins that are attached to the outer front sidewall panels and adapted to engage and extend into the slots in the second moveable panels.
Figure 10:
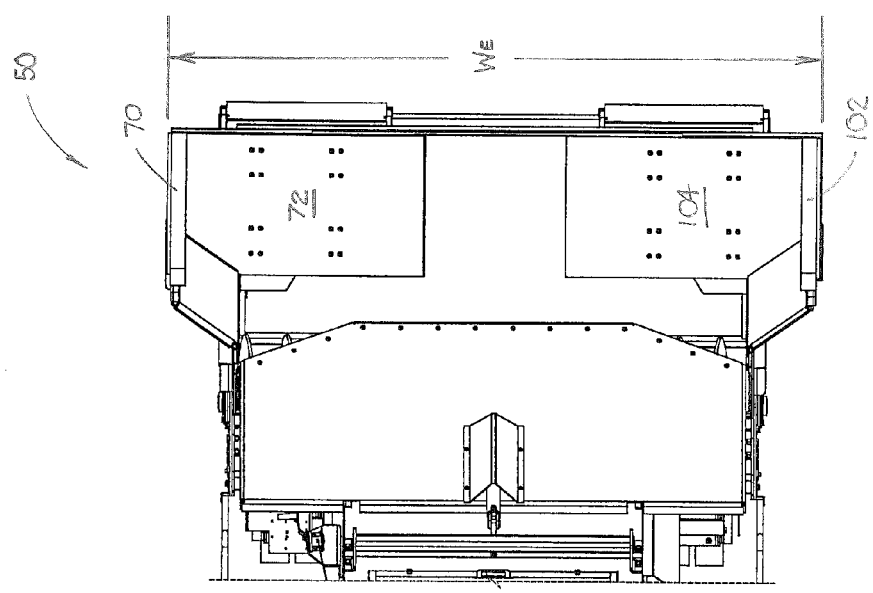
FIG. 10 is a top view of the truck-receiving hopper shown in FIGS. 8 and 9.
Figure 11:
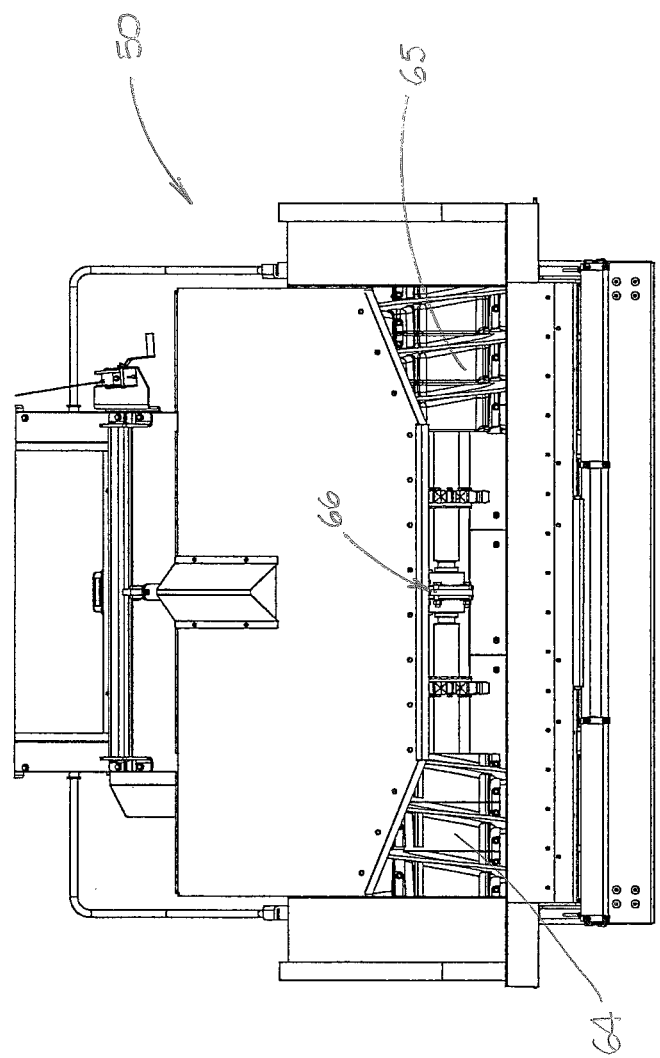
FIG. 11 is a view of the front of the truck-receiving hopper shown in FIGS. 8-10, taken along the line 11-11 of FIG. 9.
Figure 13:
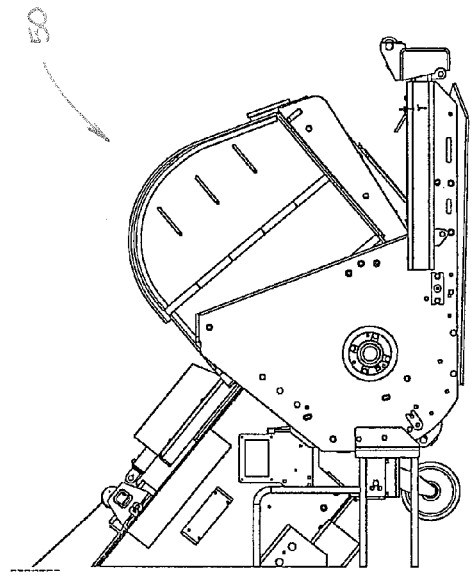
FIG. 13 is a side view of the truck-receiving hopper shown in FIG. 12.
Figure 12:
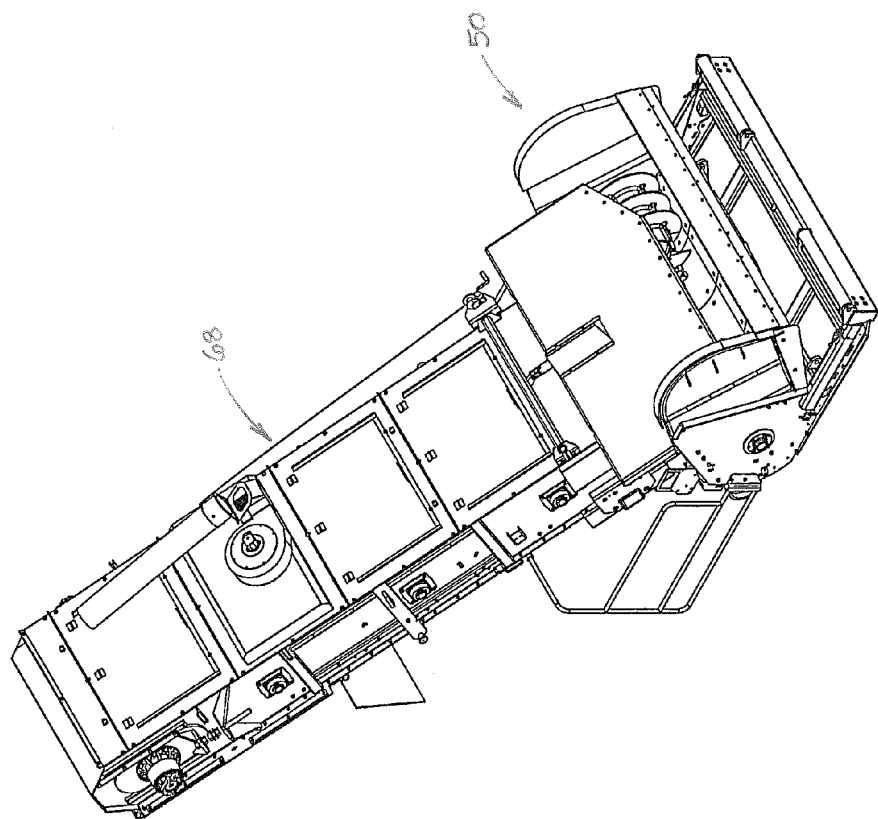
FIG. 12 is a perspective view of the truck-unloading conveyor and associated truck-receiving hopper shown in FIGS. 4-7, showing the sidewalls of the expandable sidewall assemblies in the inner or retracted positions and the expandable front portion of the hopper in a tilted position.

As shown in FIG. 7, the right and left expandable sidewall assemblies are in the retracted configuration, in which the width of front portion 51 of hopper 50 is $W_S$, essentially the same width as that of the rear hopper portion 61. FIG. 10 shows the right and left expandable sidewall assemblies in the expanded configuration, in which the width of front portion 51 of the hopper has been increased by about 20% to $W_E$, which is the width across the hopper from right outer front sidewall panel 70 and second right moveable panel 96 to the corresponding structures on the left expandable sidewall assembly. When hopper 50 is in either the configuration of FIG. 7 or the configuration of FIG. 10, the front portion 51 can be tilted as shown in FIGS. 12 and 13 with respect rear portion 61 in order to urge asphalt material into contact with the auger assembly in the rear hopper portion.

The left and right expandable sidewall assemblies are generally positioned in the retracted configuration of FIG. 7 when the material transfer vehicle is traveling or maneuvering, and they will only be moved to the extended configuration of FIG. 10 in preparation for receiving a load of asphalt material from a delivery truck. The operator of the material transfer vehicle may extend and retract the linear actuators as necessary. The invention thus provides an assembly for modifying the width of a portion of the truck-receiving hopper in order to improve the efficiency of the asphalt material delivery process and reduce the likelihood of spillage of asphalt material during unloading of a delivery truck.

Although this description contains many specifics, these should not be construed as limiting the scope of the invention but as merely providing illustrations of the presently preferred embodiments thereof, as well as the best mode contemplated by the inventor of carrying out the invention. The invention, as described herein, is susceptible to various modifications and adaptations, as would be understood by those having ordinary skill in the art to which the invention relates.

What is claimed is:

1. A material transfer vehicle comprising a truck-receiving hopper that is adapted to receive asphalt material from a truck, said truck-receiving hopper including:
    (a) an expandable front portion comprising:
        (i) a right expandable sidewall assembly having a right outer front sidewall panel and means for moving the right outer front sidewall panel between an inner right position and an outer right position;
        (ii) a left expandable sidewall assembly having a left outer front sidewall panel and means for moving the left outer front sidewall panel between an inner left position and an outer left position;
    (b) a rear portion having a right sidewall panel and a left sidewall panel, which right and left sidewall panels are fixed against movement with respect to each other.

2. The material transfer vehicle of claim 1 which includes a truck-unloading conveyor that is adapted to receive asphalt material from the truck-receiving hopper, said truck-unloading conveyor having an entry end that includes a hopper opening adjacent to the rear portion of the truck-receiving hopper.

3. The material transfer vehicle of claim 2 wherein the rear portion of the truck-receiving hopper includes an auger assembly that extends between and is supported by the left sidewall panel and the right sidewall panel.

4. The material transfer vehicle of claim 3 wherein the auger assembly comprises a pair of auger sections, each of which has a left end and a right end, and each of which is supported at its left and right ends.

5. The material transfer vehicle of claim 1, wherein the front portion of the truck-receiving hopper includes a base frame and a centerline, and wherein:

(a) the right expandable sidewall assembly includes:
  (i) a right base plate having a lower side;
  (ii) a right linear actuator that is mounted between the base frame and the lower side of the right base plate, said right linear actuator being adapted to move the right base plate between an inner right position and an outer right position with respect to the base frame;
  (iii) a first right moveable panel that is adapted to pivot about a hinge attachment with respect to the right sidewall panel of the rear portion;
  (iv) a second right moveable panel that is adapted to pivot about a hinge attachment with respect to the first right moveable panel;
  wherein the right outer front sidewall panel is attached to and extends upwardly from the right base plate;
(b) the left expandable sidewall assembly includes:
  (i) a left base plate having a lower side;
  (ii) a left linear actuator that is mounted between the base frame and the lower side of the left base plate, said left linear actuator being adapted to move the left base plate between an inner left position and an outer left position with respect to the base frame;
  (iii) a first left moveable panel that is adapted to pivot about a hinge attachment with respect to the left sidewall panel of the rear portion;
  (iv) a second right moveable panel that is adapted to pivot about a hinge attachment with respect to the first left moveable panel;
  wherein the left outer front sidewall panel is attached to and extends upwardly from the left base plate.

6. The material transfer vehicle of claim 5 wherein:
(a) the right outer front sidewall panel of the right expandable sidewall assembly forms a right angle with the plane of the right base plate;
(b) the left outer front sidewall panel of the left expandable sidewall assembly forms a right angle with the plane of the left base plate;
(c) the right outer front sidewall of the right expandable sidewall assembly and the left outer front sidewall of the left expandable sidewall assembly remain parallel to each other as the right and left baseplates move between the inner and outer positions with respect to the frame.

7. The material transfer vehicle of claim 5 wherein:
(a) the hinge attachment by which the first right moveable panel of the right expandable sidewall assembly pivots with respect to the right sidewall panel of the rear portion is generally perpendicular to the plane of the right base plate;
(b) the hinge attachment by which the second right moveable panel of the right expandable sidewall assembly pivots with respect to the first right moveable panel is generally perpendicular to the plane of the right base plate;
(c) the hinge attachment by which the first left moveable panel of the left expandable sidewall assembly pivots with respect to the left sidewall panel of the rear portion is generally perpendicular to the plane of the left base plate;
(b) the hinge attachment by which the second left moveable panel of the left expandable sidewall assembly pivots with respect to the first left moveable panel is generally perpendicular to the plane of the left base plate.

8. The material transfer vehicle of claim 5 wherein:
(a) the second right moveable panel has a right guide slot that is parallel to the plane of the right base plate;
(b) a right guide pin is attached to the right outer front sidewall panel and adapted to extend into the right guide slot;
(c) the second left moveable panel has a left guide slot that is parallel to the plane of the left base plate;
(d) a left guide pin is attached to the left outer front sidewall panel and adapted to extend into the left guide slot.

9. The material transfer vehicle of claim 5 wherein:
(a) the base frame of the front portion of the truck-receiving hopper has a front end;
(b) an outer lip is attached to the front end of the base frame;
(c) the right base plate has a front end;
(d) a right base plate lip is attached to the front end of the right base plate and is adapted to slide with respect to the outer lip as the right base plate moves;
(e) the left base plate has a front end;
(f) a left base plate lip is attached to the front end of the left base plate and is adapted to slide with respect to the outer lip as the left base plate moves.

10. The material transfer vehicle of claim 5 wherein:
(a) the right linear actuator has a first end and a second end;
(b) the first end of the right linear actuator is attached to the base frame of the front portion of the truck-receiving hopper near the centerline of the hopper;
(c) the second end of the right linear actuator is attached to the lower side of the right base plate;
(d) the left linear actuator has a first end and a second end;
(e) the first end of the left linear actuator is attached to the base frame of the front portion of the truck-receiving hopper near the centerline of the hopper;
(f) the second end of the left linear actuator is attached to the lower side of the left base plate.

11. The material transfer vehicle of claim 10 wherein:
(a) the right linear actuator comprises a double-acting actuator which includes a cylinder, a piston within the cylinder, and a rod attached to the piston;
(b) the first end of the right linear actuator is the cylinder end;
(c) the second end of the right linear actuator is the rod end;
(d) the left linear actuator comprises a double-acting actuator which includes a cylinder, a piston within the cylinder, and a rod attached to the piston;
(e) the first end of the left linear actuator is the cylinder end;
(f) the second end of the left linear actuator is the rod end.

12. A material transfer vehicle comprising a truck-receiving hopper that is adapted to receive asphalt material from a truck, said truck-receiving hopper including an expandable front portion which includes a base frame, said expandable front portion comprising:
(a) a right expandable sidewall assembly comprising:
  (i) a right outer front sidewall panel;
  (ii) a right base plate having a lower side;
  (iii) a right linear actuator that is mounted between the base frame and the lower side of the right base plate, said right linear actuator being adapted to move the right base plate between an inner right position and an outer right position with respect to the base frame;
  (iv) a first right moveable panel that is adapted to pivot about a hinge attachment with respect to the right sidewall panel of the rear portion;

(v) a second right moveable panel that is adapted to pivot about a hinge attachment with respect to the first right moveable panel;

wherein the right outer front sidewall panel is attached to and extends upwardly from the right base plate so that the right linear actuator is adapted to move the right outer front sidewall panel between an inner right position and an outer right position;

(b) a left expandable sidewall assembly comprising:
  (i) a left outer front sidewall panel;
  (ii) a left base plate having a lower side;
  (iii) a left linear actuator that is mounted between the base frame and the lower side of the left base plate, said left linear actuator being adapted to move the left base plate between an inner left position and an outer left position with respect to the base frame;
  (iv) a first left moveable panel that is adapted to pivot about a hinge attachment with respect to the left sidewall panel of the rear portion;
  (v) a second right moveable panel that is adapted to pivot about a hinge attachment with respect to the first left moveable panel;

wherein the left outer front sidewall panel is attached to and extends upwardly from the left base plate so that the left linear actuator is adapted to move the left outer front sidewall panel between an inner left position and an outer left position.

13. The material transfer vehicle of claim 12:
(a) wherein the truck-receiving hopper includes a rear portion comprising:
  (i) a right sidewall panel which is fixed against lateral movement;
  (ii) a left sidewall panel which is fixed against lateral movement;
  (iii) an auger assembly that extends between and is supported by the left sidewall panel and the right sidewall panel;
(b) which includes a truck-unloading conveyor that is adapted to receive asphalt material from the truck-receiving hopper, said truck-unloading conveyor having an entry end that includes a hopper opening adjacent to the rear portion of the truck-receiving hopper.

14. The material transfer vehicle of claim 12 wherein:
(a) the hinge attachment by which the first right moveable panel of the right expandable sidewall assembly pivots with respect to the right sidewall panel of the rear portion is generally perpendicular to the plane of the right base plate;
(b) the hinge attachment by which the second right moveable panel of the right expandable sidewall assembly pivots with respect to the first right moveable panel is generally perpendicular to the plane of the right base plate;
(c) the hinge attachment by which the first left moveable panel of the left expandable sidewall assembly pivots with respect to the left sidewall panel of the rear portion is generally perpendicular to the plane of the left base plate;
(b) the hinge attachment by which the second left moveable panel of the left expandable sidewall assembly pivots with respect to the first left moveable panel is generally perpendicular to the plane of the left base plate.

15. The material transfer vehicle of claim 12 wherein:
(a) the second right moveable panel has a plurality of right guide slots, each of which is parallel to the plane of the right base plate;
(b) a right guide pin for each right guide slot is attached to the right outer front sidewall and adapted to extend into the associated right guide slot;
(c) the second left moveable panel has a plurality of left guide slots, each of which is parallel to the plane of the left base plate;
(d) a left guide pin for each left guide slot is attached to the left outer front sidewall and adapted to extend into the associated left guide slot.

16. The material transfer vehicle of claim 12 wherein:
(a) the base frame of the front portion of the truck-receiving hopper has a front end;
(b) an outer lip is attached to the front end of the base frame;
(c) the right base plate has a front end;
(d) a right base plate lip is attached to the front end of the right base plate and is adapted to slide with respect to the outer lip as the right base plate moves;
(e) the left base plate has a front end;
(f) a left base plate lip is attached to the front end of the left base plate and is adapted to slide with respect to the outer lip as the left base plate moves.

17. The material transfer vehicle of claim 12 wherein:
(a) the front portion of the truck-receiving hopper includes a centerline;
(b) the right linear actuator has a first end and a second end;
(c) the first end of the right linear actuator is attached to the base frame of the front portion of the truck-receiving hopper near the centerline of the front portion of the truck-receiving hopper;
(c) the second end of the right linear actuator is attached to the lower side of the right base plate;
(d) the left linear actuator has a first end and a second end;
(e) the first end of the left linear actuator is attached to the base frame of the front portion of the truck-receiving hopper near the centerline of the front portion of the truck-receiving hopper;
(f) the second end of the left linear actuator is attached to the lower side of the left base plate.

18. The material transfer vehicle of claim 17 wherein:
(a) the right linear actuator comprises a double-acting actuator which includes a cylinder, a piston within the cylinder, and a rod attached to the piston;
(b) the first end of the right linear actuator is the cylinder end;
(c) the second end of the right linear actuator is the rod end;
(d) the left linear actuator comprises a double-acting actuator which includes a cylinder, a piston within the cylinder, and a rod attached to the piston;
(e) the first end of the left linear actuator is the cylinder end;
(f) the second end of the left linear actuator is the rod end.

* * * * *